(12) United States Patent
Watford et al.

(10) Patent No.: US 6,341,443 B1
(45) Date of Patent: Jan. 29, 2002

(54) FISHING STAND WITH AN ALARM

(76) Inventors: Earl McCoy Watford, 12402 Gable La.; Alisha Althea Watford, 12401 Gable La., both of Ft. Washington, MD (US) 20744

( * ) Notice: Subject to any disclaimer, the term of this patent is extended or adjusted under 35 U.S.C. 154(b) by 0 days.

(21) Appl. No.: 09/533,324

(22) Filed: Mar. 22, 2000

(51) Int. Cl.$^7$ ............................................. A01K 97/12
(52) U.S. Cl. ............................................. 43/17; 43/21.2
(58) Field of Search .................................. 43/17, 21.2

(56) References Cited

U.S. PATENT DOCUMENTS

| | | | | |
|---|---|---|---|---|
| 1,330,314 A | * | 2/1920 | Gott | 43/17 |
| 2,567,777 A | * | 9/1951 | Massino | 43/17 |
| 2,816,388 A | * | 12/1957 | Hartley | 43/17 |
| 3,020,664 A | * | 2/1962 | Snyder | 43/17 |
| 3,228,135 A | * | 1/1966 | Kricksfeld | 43/17 |
| 3,546,805 A | * | 12/1970 | Schaeffer | 43/17 |
| 3,670,443 A | * | 6/1972 | Federline | 43/17 |
| 3,713,131 A | * | 1/1973 | Marshall | 43/17 |
| 3,780,466 A | * | 12/1973 | Hadnot | 43/17 |
| 3,835,568 A | * | 9/1974 | Whitfield | 43/17 |
| 3,846,929 A | * | 11/1974 | McBride | 43/17 |
| 4,004,365 A | | 1/1977 | Manchester | 43/17 |
| 4,112,607 A | | 9/1978 | Scher | 43/17 |
| 4,236,339 A | * | 12/1980 | White | 43/17 |
| 4,523,403 A | * | 6/1985 | Ivy | 43/17 |
| 5,063,373 A | * | 11/1991 | Lindsley | 43/17 |
| 5,185,949 A | * | 2/1993 | Patterson | 43/17 |
| 5,269,088 A | | 12/1993 | Slaback, Jr. et al. | 43/17 |
| 5,355,610 A | * | 10/1994 | Sizemore | 43/17 |
| 5,533,295 A | | 7/1996 | Hochberger | 43/21.2 |
| 5,570,532 A | * | 11/1996 | Shaffer | 43/17 |
| 5,581,930 A | * | 12/1996 | Langer | 43/17 |
| 5,890,312 A | | 4/1999 | Ball | 43/16 |
| 5,903,998 A | | 5/1999 | Hawkins et al. | 43/15 |
| 5,934,004 A | | 8/1999 | Koe | 43/21.2 |
| 5,937,567 A | | 8/1999 | Elkins | 43/21.2 |
| 5,943,808 A | | 8/1999 | Bryant | 43/17 |
| 5,975,479 A | | 11/1999 | Suter | 248/534 |
| 5,987,804 A | | 11/1999 | Shearer | 43/21.2 |
| 5,992,081 A | | 11/1999 | Elkins | 43/21.2 |

* cited by examiner

*Primary Examiner*—Kurt Rowan

(57) ABSTRACT

A fishing stand used to support at least one fishing rod that provides an audible and/or visual signal when a fish strikes. The stand is a T-shaped tubular adjustable apparatus with a tripod base used to hold up the apparatus and rod(s) on any type of terrain. The stand preferably includes a detachable audible and/or visual signaling device. The stand supports the upper end of the rod above a switch connected to the stand. The signaling device is actuated by a sufficient downward force on one or more fishing rods above the switch.

21 Claims, 21 Drawing Sheets

FISHING STAND WITH AN ALARM

TECHNICAL FIELD OF THE INVENTION

Generally, the invention relates to fishing equipment and accessories. In particular, the invention relates to an improved stand that supports at least one fishing rod and has an alarm for audibly and/or visually signaling an angler that a fish is biting on the bait.

BACKGROUND OF THE INVENTION

Anglers or fishers fish from shore, from a pier, and/or from other locations such as boats. Anglers have to watch their pole to determine when a fish is biting the bait. The angler upon noticing such a strike must quickly take hold of their pole and reel in the line to set the hook in the fish. Otherwise, the fish will get away.

Anglers that fish from shore usually prop their fishing rod(s) up with rocks or sticks or whatever happens to be convenient. Anglers that fish from the pier typically propped their fishing rods up against the pier railing. These supports allow the angler's hands to be free to attend to other tasks until a strike is made. Furthermore, holding a pole for a significant amount of time can be tiring for the angler. If the angler does not pay close attention to the rods, a fish can bite then get off the hook. Also, at night, it is nearly impossible to watch the rod without a light of sufficient intensity, which can be expensive.

To enhance the angler's productivity, comfort, and enjoyment, numerous devices have been suggested for holding the pole and for signaling the strike of a fish. In many prior art devices, the fishing rod is clamped into the support so that removal of the rod upon a strike is difficult. In other prior art devices, the configuration of the apparatus requires that the entire rod holder and signal generator be held, while the angler plays the fish. Such constructions are cumbersome during use, which is undesirable. Therefore, an improved support and signaling device for use during fishing is thus desired.

SUMMARY OF THE INVENTION

The present invention is directed to an apparatus for supporting at least one fishing rod and signaling the angler should a fish strike, or bite on the bait or hook. The apparatus is a stand for holding at least one fishing rod having a handle, a free end spaced therefrom, and a line. The stand includes a frame, a signaling device, and a switch. The frame supports the rod between the handle and the free end. The signaling device provides at least one signal to a user when a fish pulls the line. The switch is supported by the frame and electrically connected to the signaling device. The switch is disposed beneath the rod. Upon the fish pulling the line, the rod moves downward and depresses the switch causing the signaling device to signal the user.

The signal can be visual, audible, or both. The visual signal can be provided by a light emitting diode. The audible signal can be provided by a horn or a recorded message.

In one embodiment, the signaling device further includes a transmitter, and the transmitter is operatively associated with a radio so that the transmitter sends the signal to the radio.

In yet another embodiment, the signal device is removably secured to the frame.

The frame in another embodiment includes a vertical section including an upper tube and a lower tube slidably coupled thereto. The horizontal tube can be one piece or several pieces pivotal with respect to one another. The horizontal section supports a supporting member with the switch, an actuator, and a spring mount thereto. The actuator has a pivotal member that is disposed above the switch and a spring mount coupled to the rod supporting member. The spring mount has a cradle disposed above the pivotal member, wherein in an unactuated position, the cradle is spaced from the pivotal member, and a first force by the pivotal member on the switch in below a predetermined value. Upon actuation, the cradle exerts a second force on the pivotal member and the pivotal member exerts the first force on the switch. In an alternative embodiment, various springs can be releasably coupled to the supporting member. The springs have various spring constants for signaling fish of various weights.

One feature of the present invention is a tripod base including foldable legs pivotally connected to the lower tube. In one embodiment, each leg includes a weight. In another embodiment, each leg includes an upper leg portion, a lower leg portion coupled by a piston, a switch and battery connected to the piston. Upon actuation of the switch, the piston slides the lower leg portion with respect to the upper leg portion so that the legs allow the stand to be self-leveling or automatically raise to set the hook in a fish.

BRIEF DESCRIPTION OF THE DRAWINGS

FIG. 7A is a schematic view of the internal circuitry of the signaling device of FIG. 7;

DETAILED DESCRIPTION OF THE INVENTION

Figure 1:
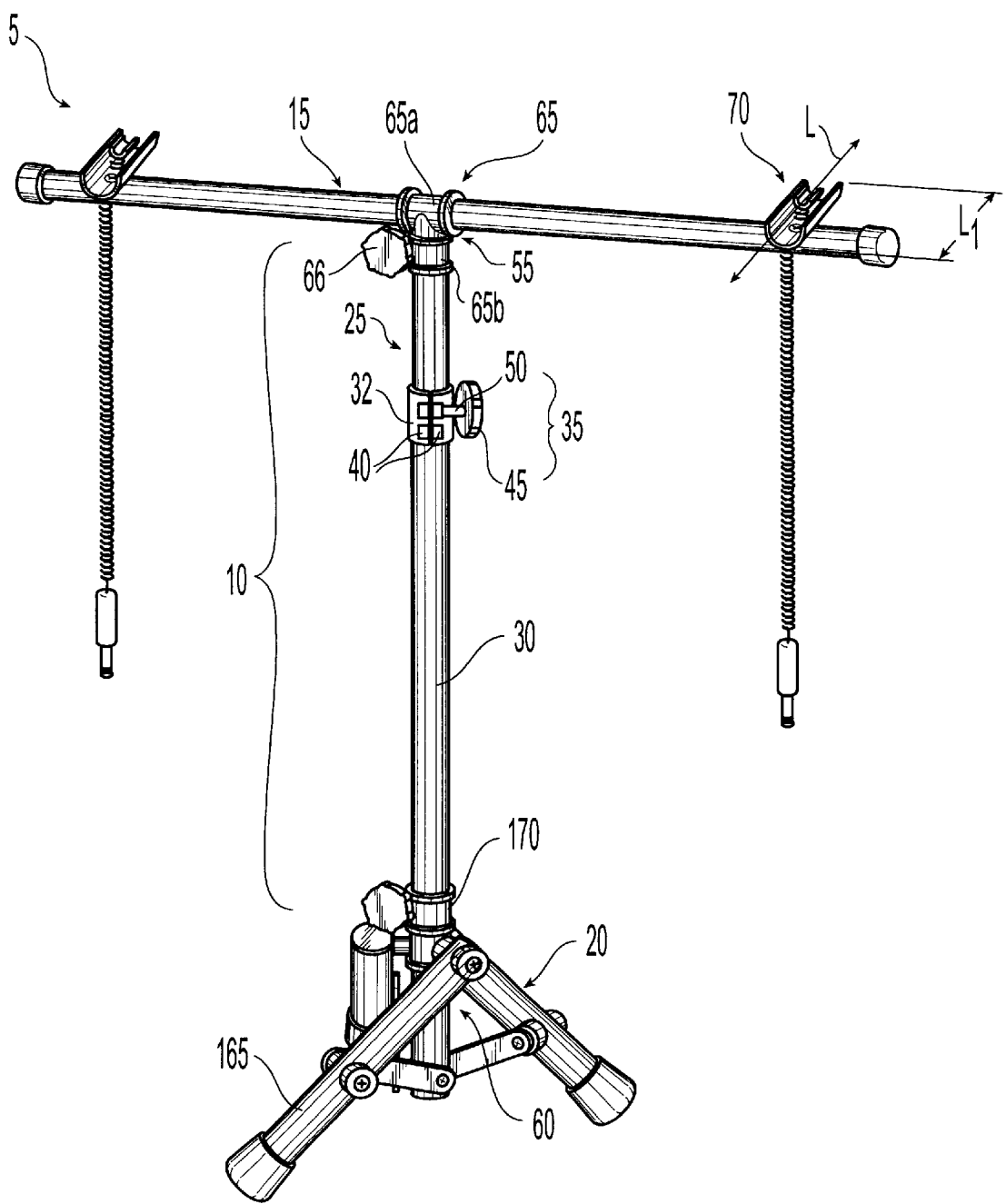
FIG. 1 is a partial, perspective view of a stand of the present invention, wherein a plurality of rods and a signaling device are removed therefrom.

Referring to FIG. 1, a stand 5 includes a vertical section 10, a horizontal tube 15, and tripod base 20. The vertical section 10 and the horizontal tube 15 form a substantially T-shaped frame. The vertical section 10 includes an upper tube 25, a bottom tube 30 slidably coupled to the upper tube 25, and releasably secured together with a clamp 35. The upper tube 25 has an outer diameter smaller than the inner diameter of the bottom tube 30 so that the upper tube 25 can slide within the bottom tube in a telescoping fashion. This allows the stand to have various heights depending on the user's needs. The lower tube has a length of about 34.5 inches and the upper tube has a length of about 28.5 inches. Although it is preferred that the lower tube have a length greater than the upper tube, this is not required.

The clamp 35 is disposed to contact the upper tube 25 and the bottom tube 30. The clamp includes a cylindrical cuff 32 that defines threaded holes 40 at each of the free ends. The clamp 35 further includes knob 45 fixed to a threaded shaft 50. When the shaft 50 is located within the holes 40 turning the knob 45 in a first direction tightens the clamp 35 around the tubes 25 and 30 to secure the tubes 25 and 30 from moving with respect to one another. Turning the knob 45 in a second, direction opposite from the first direction loosens the clamp 35 and allows the tubes 25 and 30 to move with respect to one other in the telescoping manner. One recommended clamp 35 is commercially available from Ultimate® Support Systems, Inc. of Fort Collins, Colo. under the name Tripod Telescoping Collar (Part No. TCR-150) and Handknob. Preferably, the cuff is formed of glass-reinforced polycarbonate.

Figure 2:
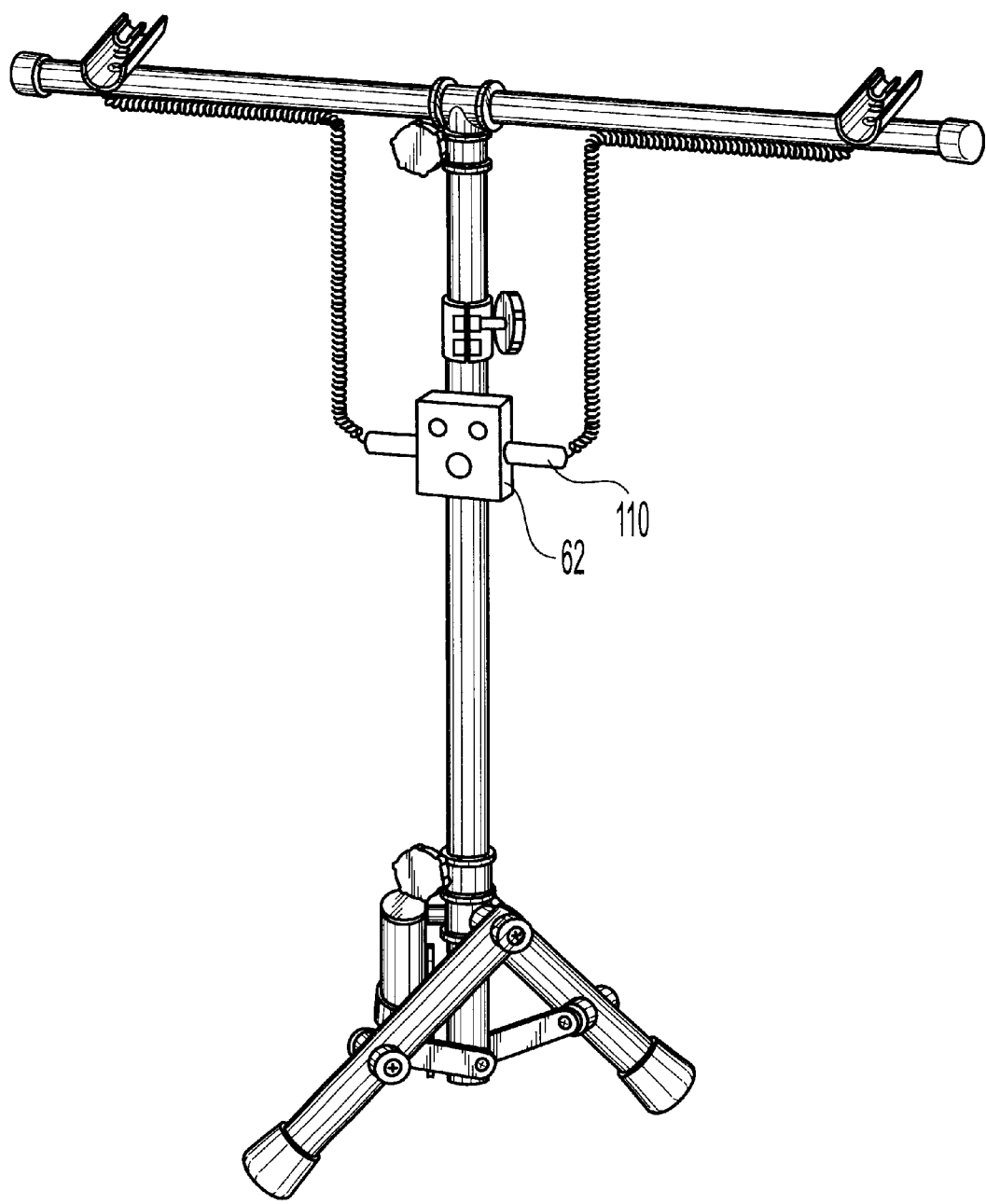
FIG. 2 is a partial, perspective view of the stand of FIG. 1, wherein the signaling device is mounted thereto and the rods are removed therefrom.

The vertical section 10 further includes a top end 55, a spaced bottom end 60, and signaling device 62 (as shown in FIG. 2). A clamp 65 that has two cylindrical cuff sections 65a and 65b at 90° to one another. One cuff section 65a receives the horizontal tube 15 and the other section 65b receives the upper tube 25 and has knob 66 operatively connected thereto. The clamp 65 can be loosened and tightened, as described above. One recommended clamp 65 is commercially available from Ultimate® Support Systems, Inc. of Fort Collins, Colo. under the name T-Frame Base (Part No. KRB-220B 22") and Handknob.

Figure 3:
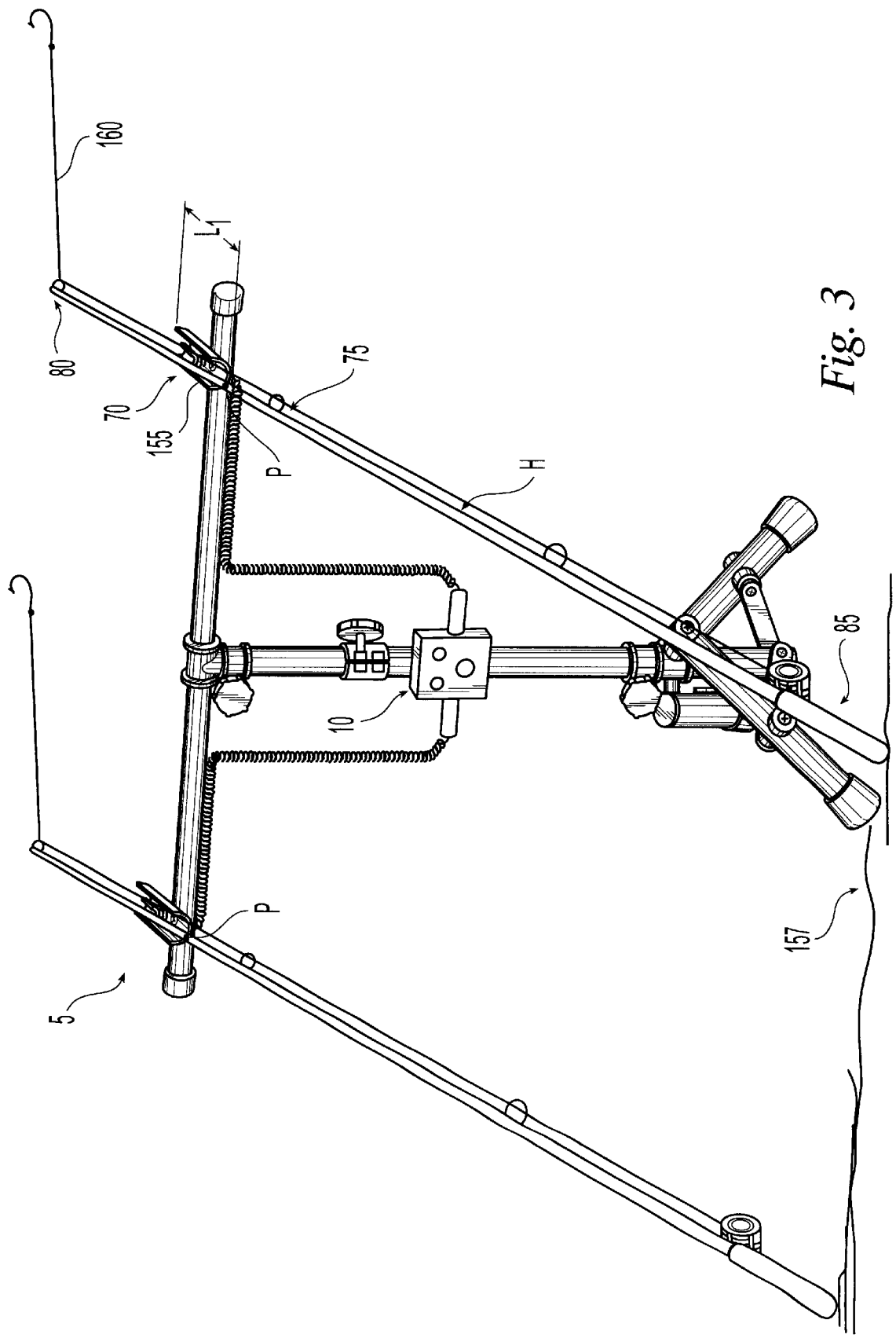
FIG. 3 is a partial, perspective view of the stand of FIG. 1, wherein the rods are in use and the signaling device is mounted thereon.

The horizontal tube 15 has a length of about 50 inches and includes rod supporting members 70 near each free end of the tube 15. Each rod supporting member 70 extends along a longitudinal axis L. The rod supporting members 70 are secured to the tube 15 by a galvanized nut and bolt (not shown). The rod supporting members 70 have a length L1 such that a portion of a rod 75 (as shown in FIG. 3) between a free end 80 of the rod and handle 85 is supported by the member 70. In one embodiment, the length of the rod supporting member 70 is about 4.5 inches. Each rod supporting member 70 is formed by cutting a cylindrical tube of material in half so that the support has a C-shape. This aids in retaining the rod within the supporting member. The inner surface of the support members can be covered with a padding material such as fabric, hook and loop type tape, or the like. The outer surface of the supporting members can also be covered with a hook and loop type tape and a strap with complementary hooks or loops can be wrapped about the support member to releasably secure the rod within the supporting member. This securement however allows quick release of the rod in the event of a strike since it is not a clamp.

Figure 4:
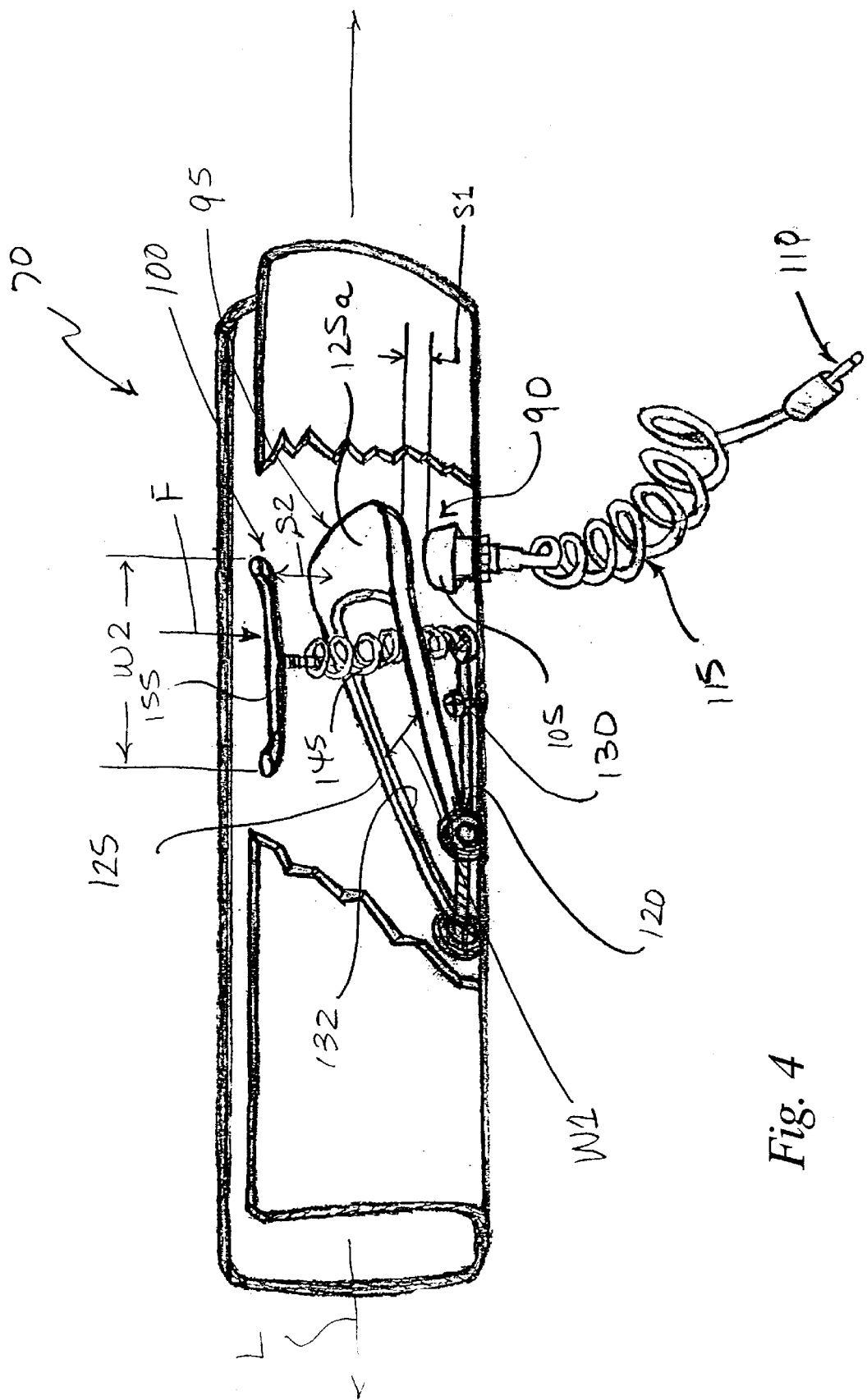
FIG. 4 is an enlarged, perspective view of a rod supporting member for use with the stand of FIG. 1, wherein a portion of the supporting member is broken away for clarity.

Referring to FIG. 4, each rod supporting member 70 has mounted therein a momentary switch 90, an actuator 95, and a spring mount 100. The momentary switch 90 includes a movable head 105, a male electrical connector 110, and an insulated wire for providing electrical communication between the head 105 and the connector 110. The electrical connector is for electrically connecting the switch 90 to the internal circuitry within a signaling device 62 (as shown in FIG. 2), to be discussed below. One recommended momentary switch 90 is commercially available from Radio Shack® under the name Mid-Push Button Switch (Part No. GC 35411BU). When a downward force is exerted on the head 105, the head 105 is depressed and a signal is generated and sent along the wire 115 to the connector 110.

Figure 5:
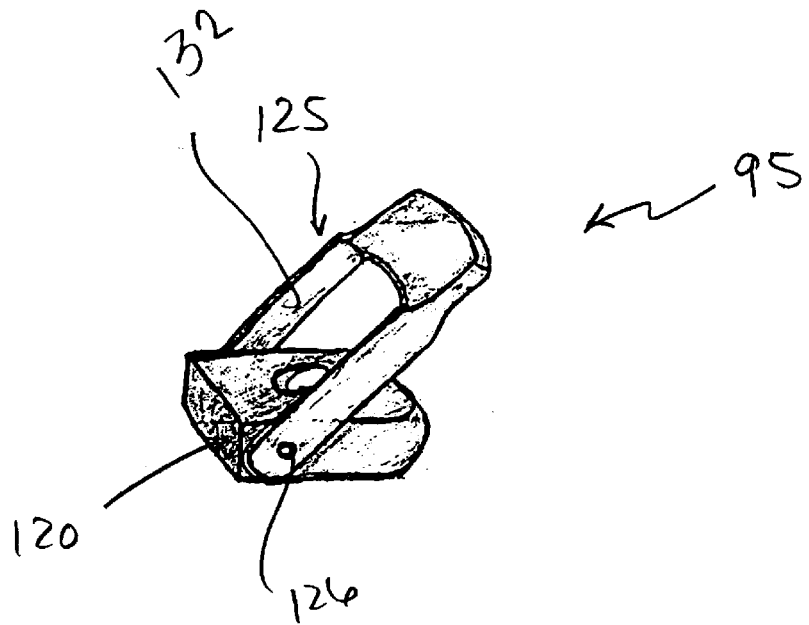
FIG. 5 is an enlarged, perspective view of an actuator for use with the stand of FIG. 1.

Referring to FIGS. 4 and 5, the actuator 95 includes a lower member 120 and an upper member 125 pivotally connected thereto by a pin 126. The actuator lower and upper members 120 and 125 may be formed of a Bakelite™ or some other suitable material. The lower member 120 is fixed to rod supporting member 70 by a conventional fastener 130. The actuator 95 is configured, dimensioned and located so that the free end 125a of the upper member 125 is above the head 105 of the momentary switch 90. The upper member 125 is U-shaped so that a cutout 132 is defined thereby. The width of the cutout 132 is designated as W1.

In an unactuated position (as shown), the free end 125a of the actuator 95 is spaced from the head 105 a distance designated S1. In another embodiment, the free end 125a of the actuator 95, in the unactuated position, can be touching the head 105 without exerting sufficient force to actuate the switch 90. When a downward force is exerted on the free end 125a, the free end moves downward and contacts the head 105 exerting a force thereon.

Figure 6:
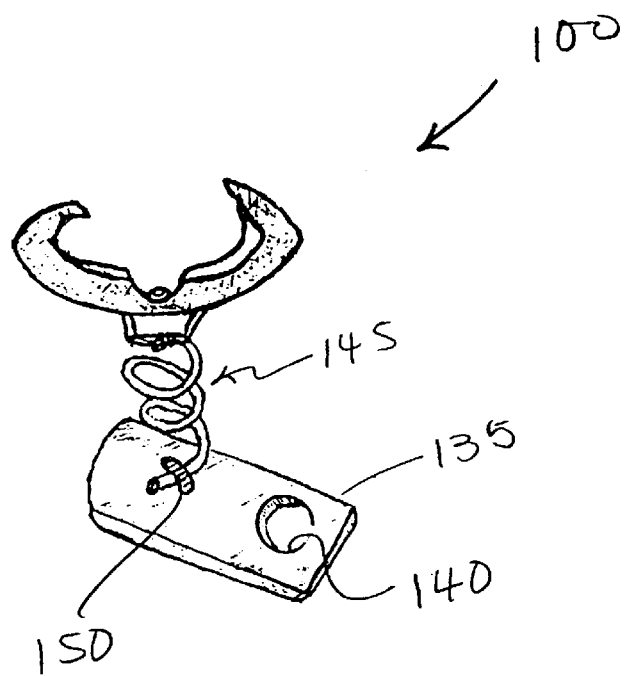
FIG. 6 is an enlarged, perspective view of a spring mount for use with the stand of FIG. 1.

Referring to FIGS. 4 and 6, the spring mount 100 optionally includes a base 135 that defines a hole 140 for receiving the fastener 130 to connect the spring mount to the rod supporting member 70. The spring mount 100 further includes a coil spring 145 connected to the base by a bracket 150 at one end. The other end of the coil spring 145 is connected to a cradle 155. In use, the rod 75 is supported by the cradle 155 so that it rests thereon but is not fastened or fixed thereto. The spring mount 100 is configured, dimensioned and located so that the spring 145 extends through the cutout 132 in the upper member 125 and the cradle 155 is disposed above the upper member 120. The cradle 155 is substantially perpendicular to the longitudinal axis L1 and has a width W2 greater than the width W1 of the actuator 95 cutout 132.

In an unactuated position (as shown), the cradle 155 is spaced from the free end 125a of the actuator 95 a distance designated S2. When a downward strike force F of sufficient magnitude is exerted on the cradle 155, the spring 145 is compressed and the cradle 155 moves downward and contacts the free end 125a exerting a force thereon. As shown in FIGS. 3 and 4, the fishing rod 75 is supported by the cradle so that the handle 85 is supported by the ground 157. The strike force F occurs when a fish (not shown) pulls down in the line 160. The spring 145 is selected so that it will not compress unless the force F is greater than about 11 ozs. As a result, the stand 5 will not give false signals for forces less than 11 ozs such as occur when the line is blown by the wind or when the line contacts something in the water, such as vegetation. Both of these phenomenon will pull on the line 160 with a force less than 11 ozs so that the cradle 155 does not contact actuator 95.

Referring to FIGS. 3 and 4, depending on the length of the rod 75, the rod has a flex point P. When a fish bites on the line, the rod flexes up to the flex point P. It is preferred that the supporting members 70, actuator 95, spring mount 100 and switch 90 be configured so that the switch 90 is beneath the rod between the flex point P and the free end 80 of the rod. In most rods, the flex point P is about a third of the length of the rod from the free end of the rod. The length of the rod and its flex point depends on the type and size of the fish being caught.

Referring to FIG. 1, the tripod base 20 includes three, foldable legs 165 pivotally connected to the lower tube 30 and collar 170. The collar 170 slides on the lower tube 30 to change the position of the legs from a retracted position (not shown), where the legs are aligned with the tube 30 to an extended position, as shown, where the legs support the stand 5. One recommended clamp 170 is commercially available from Ultimate® Support Systems, Inc. of Fort Collins, Colo. under the name Tripod Leg Fitting (Part No. TLF-162) and Handknob. Preferably, the cuff is formed of glass-reinforced polycarbonate.

Each leg 165 is a tubular member that contains a weight (not shown). The weight is an about 16 oz lead bar connected to the leg by a conventional fastener (not shown). The weight helps the stand 5 maintain its stability and balance so that the stand remains in the proper position on various terrain and on windy days.

The upper tube 25, lower tube 30, horizontal tube 15, each rod supporting member 70 and the legs 165 are all formed of various lengths of hollow, metal tubing that has an outer diameter of about 1.75 inches. The metal selected is aluminum. However, various other materials can be used that provide the necessary strength and workability for the present invention, such as steel, brass, plastic, composite materials, Bakelite™, or wood. Some materials will require a conventional corrosion resistant treatment applied by for example spray so that the stand will not be damaged by outdoor use and contact by rain.

Figure 7:
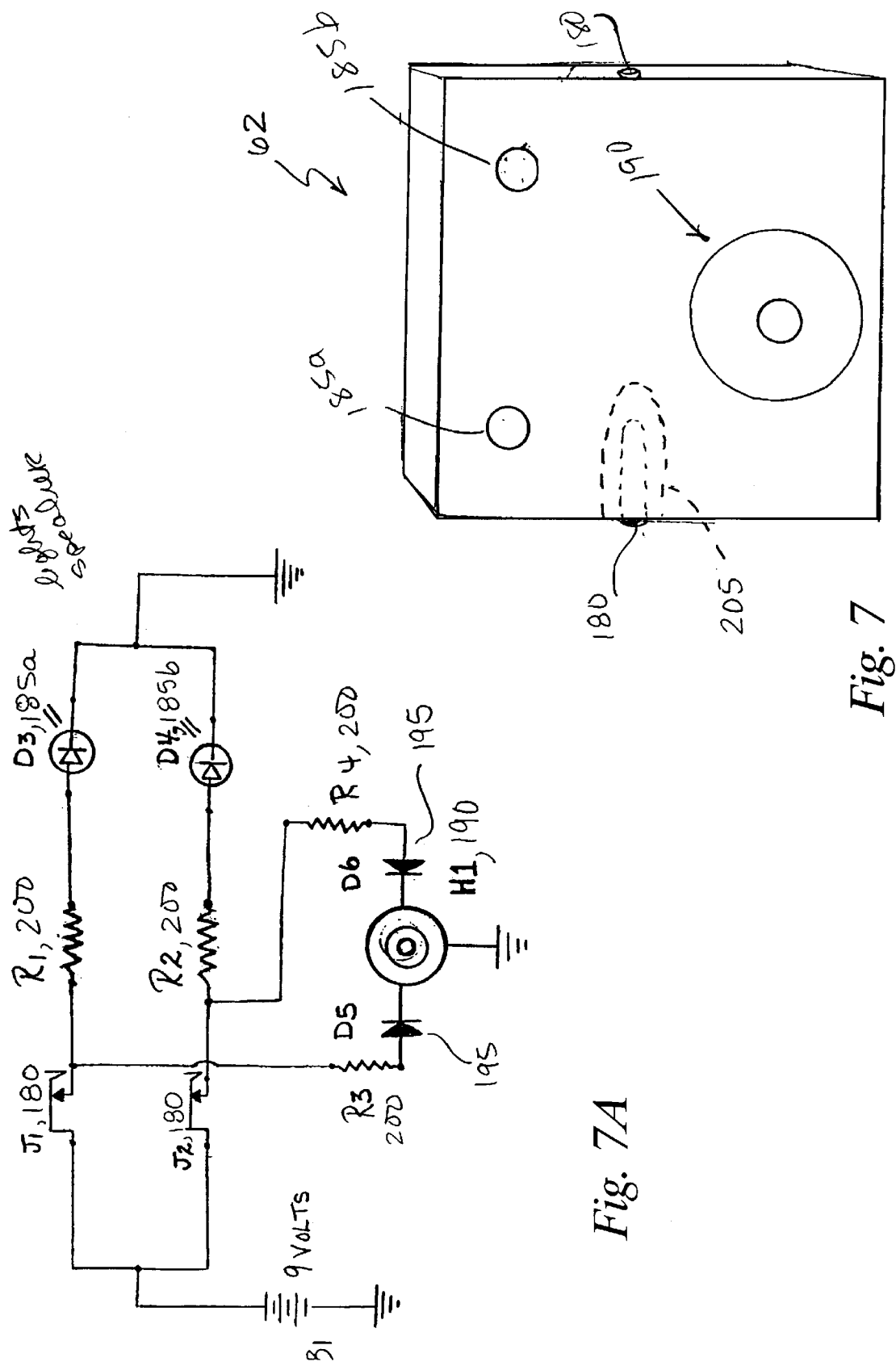
FIG. 7 is an enlarged, perspective view of the signaling device for use with the stand of FIG. 1.

Referring to FIGS. 2, 7, and 7A, the signaling device 62 emits an audible and visual signal, when a fish strikes to alert the user. The device 62 is removably secured to the vertical section 10 of the stand 5, such as by conventional hook and loop fasteners. The device includes a housing 175 of Bakelite™ for containing two conventional 3.5 mm female plugs 180, two light emitting diodes 185a and b, a piezoelectric horn 190, general purpose diodes 195 and four resistors 200. The plugs 180 are available at Radio Shack® and manufactured by GC Electronics under the name 3.5 mm shielded phone plug. The circuit further includes a nine volt battery B1. The electrical components are arranged as disclosed in FIG. 7A. The male connectors 110 associated with each rod supporting member 70 are disposed within the female plugs 180. The device 62 further includes a barrier member 205 (shown in phantom) for protecting the internal circuitry from water.

Referring to FIGS. 3, 4, and 7, when a fish pulls on the line 160, the cradle 155 moves downward and contacts the free end 125a of the actuator 95, which in turn depresses the head 105 of the switch 90. Upon actuating the switch 90, a signal is sent to the associated light emitting diode 185a or 185b causing the light emitting diode to light up. Additionally, the signal is sent to the horn 190 causing the horn to emit an audible signal. As a result, the user knows a fish is on their line and knows which rod has the fish. To aid with night fishing the light emitting diodes can be of different colors so that one color, such as green, indicates a strike on the rod on the right-side of the stand, and another color, such as red, indicates a strike on the left-side of the stand. Furthermore, for night fishing each side can have its own distinctive audible signal. Once a strike is signaled, the user can quickly remove the rod 75 from the stand and set the hook. Once the rod is removed from the cradle 155, the switch 90, actuator 95, and spring mount 100 return to the unactuated position.

In another embodiment, the signaling device can include either the audio or visual alarm instead of both.

Figure 8:
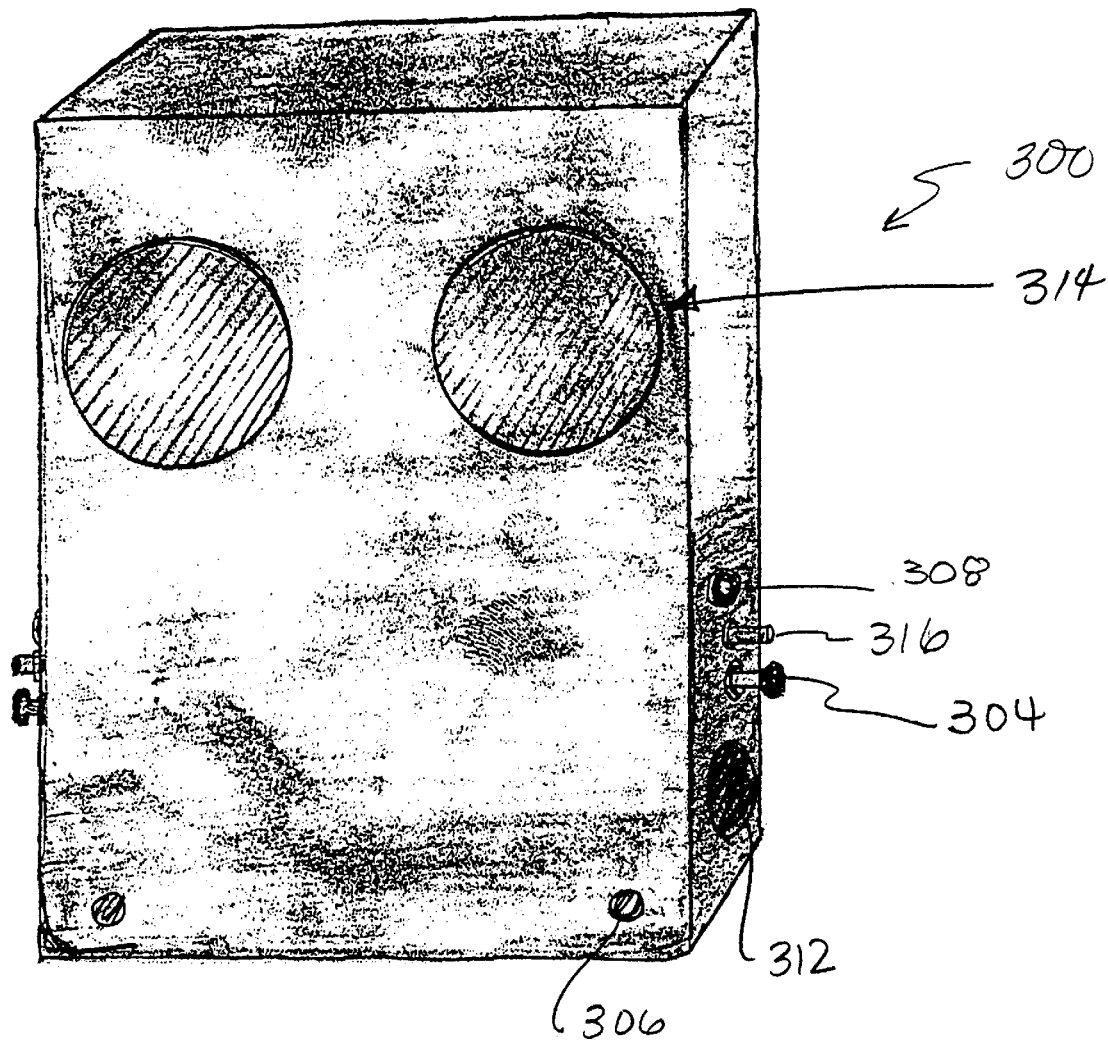
FIG. 8 is an enlarged, perspective view of an alternative embodiment of the signaling device for use with the stand of FIG. 1.
Figure 8A:
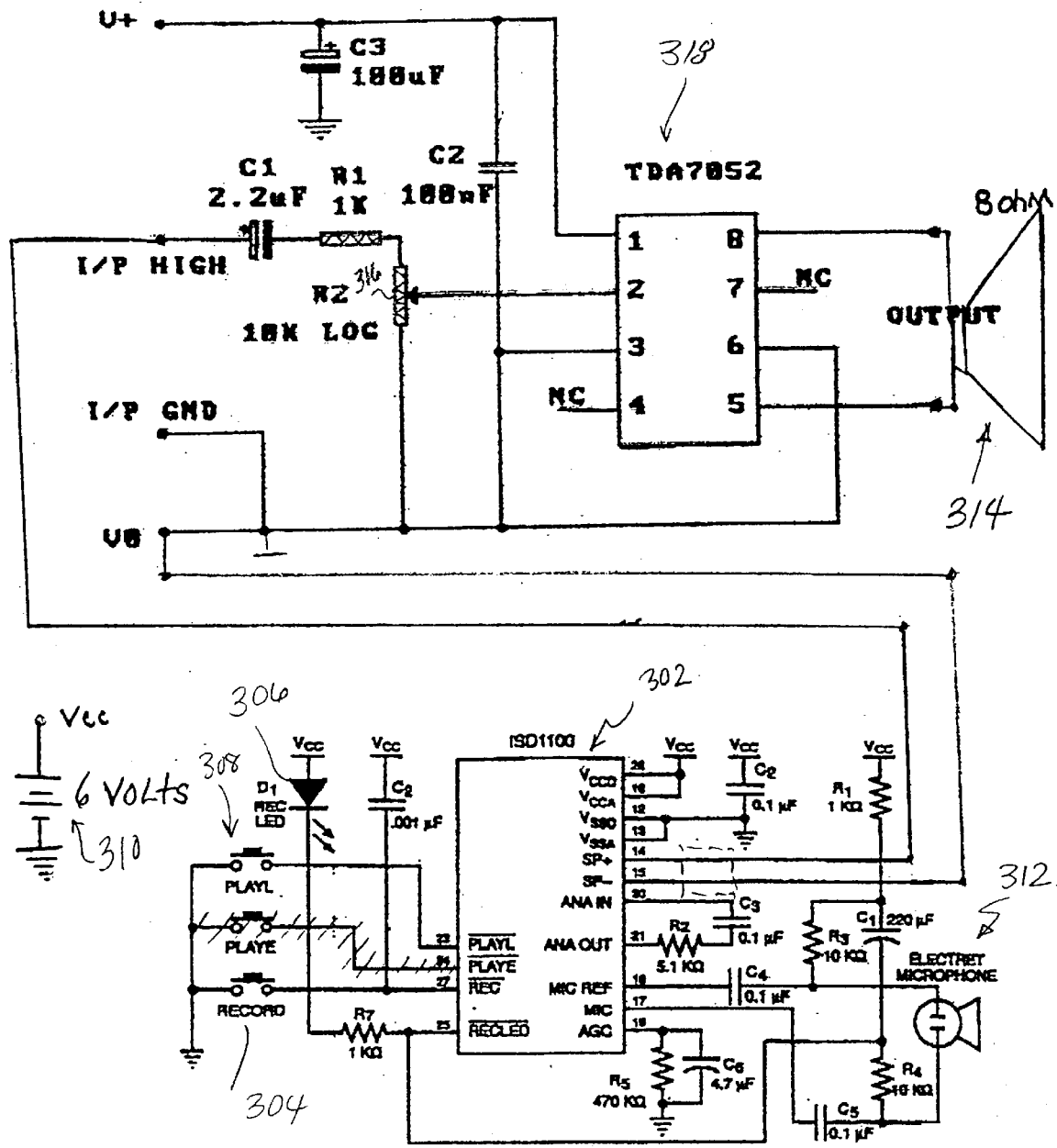
FIG. 8A is a schematic view of the internal circuitry for a right-side of the signaling device of FIG. 8.
Figure 8B:
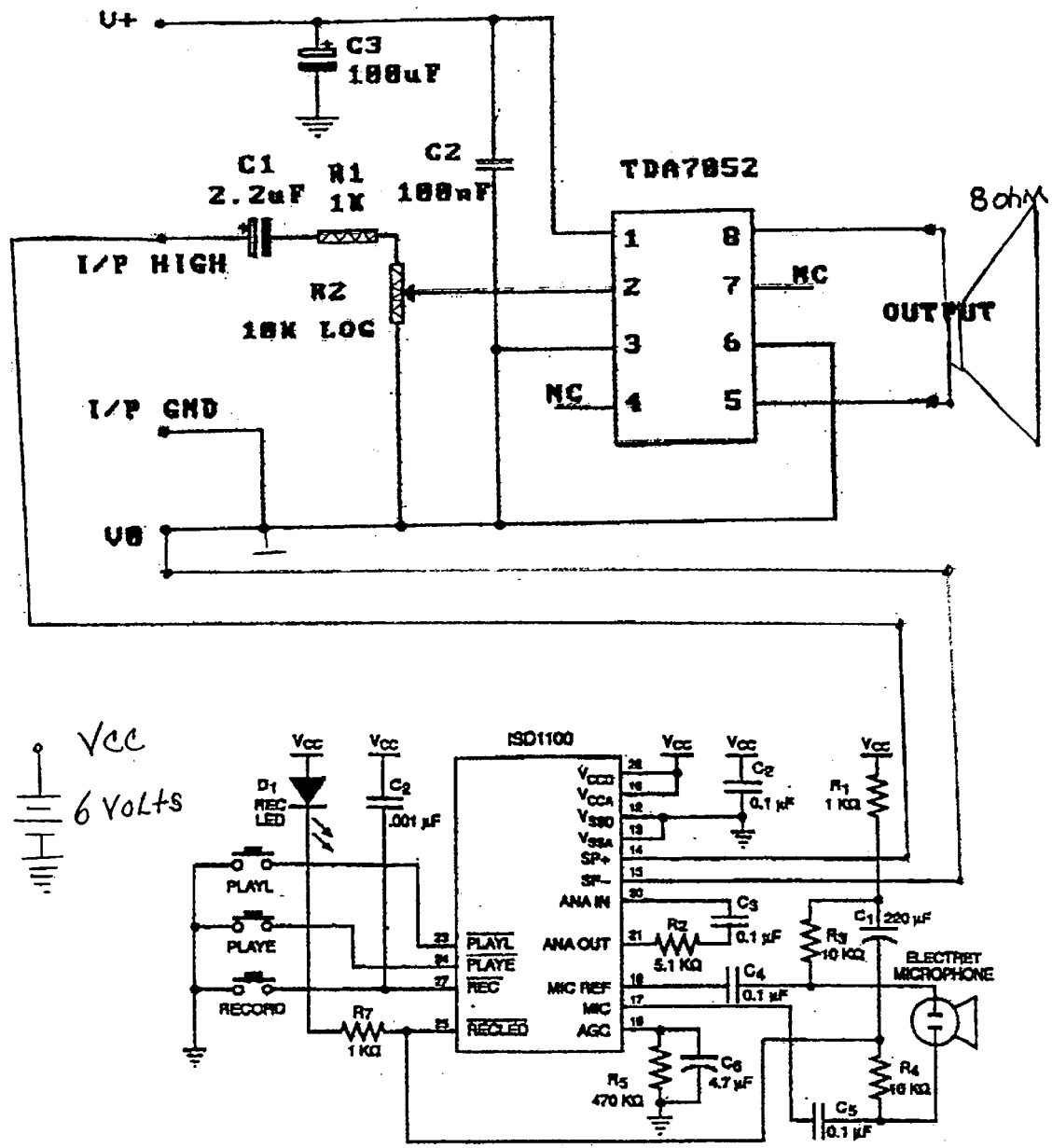
FIG. 8B is a schematic view of the internal circuitry for a left-side of the signaling device of FIG. 8.

Referring to FIGS. 8, 8A and 8B, another embodiment of a signaling device 300 is shown along with its internal circuitry and components. The device 300 is a voice messaging signal device with the ability to record a message by the manufacturer or user. The housing is similar to that discussed above and the device 300 works similarly to the device 62 above; however, when a fish strikes, the device 300 issues a verbal command indicating which pole is struck. The device 300 has two separate channels indicated by the left-side and right-side circuitry in FIGS. 8A and 8B. The major components of each circuit side of the device are the same therefore only the components of the right-side circuit (as shown in FIG. 8A) will be discussed.

The right-side circuitry includes an electronically erasable programmable read-only memory (EEPROM) 302 in which the message is stored in non-volatile memory cells. The EEPROM is commercially available from Jameco Electronics under the name Voice Record/Playback (Part No. 141671). It is recommended that the EEPROM provides easy-to-use single-chip voice record/playback solution, high-quality natural voice/audio reproduction, push-button interface, edge-or level-activated playback, zero-power message storage eliminating battery backup circuits, 100-year message retention, 100K record cycle, and automatic power-down mode. The voice of the pre-recorded message can be programmed by the manufacturer or the user, and is preferably limited to 10 seconds. However, the duration of the message can be changed depending on the voice recorded chip used.

The right-side further includes a record miniature momentary switch 304, a record light emitting diode 306, a 3.5 mm female plug 308 electrically connected to a momentary switch 90 (FIG. 4) in the supporting member 70, a power supply 310 of 6 volts, a microphone 312, a speaker 314, and a volume control 316. The right-side circuitry optionally further includes a 1 watt amplifier 318 for amplifying the message during playback so that the angler can hear it sufficiently. The power source is four 1.5 volt AA batteries connected in series.

The switch 304 upon actuation activates the recording feature of the EEPROM 302, and the sound source is put in proximity of the microphone 312 so that the sound therefrom can be recorded on the EEPROM. The circuitry does not require power unless the angler is recording or the signal device is playing. The sound source can be a user's voice or prerecorded sounds.

In another embodiment, the device can include only one speaker. In yet another embodiment, a single stereo amplifier with two watts can be used instead of two one watt amplifiers.

Figure 8C:
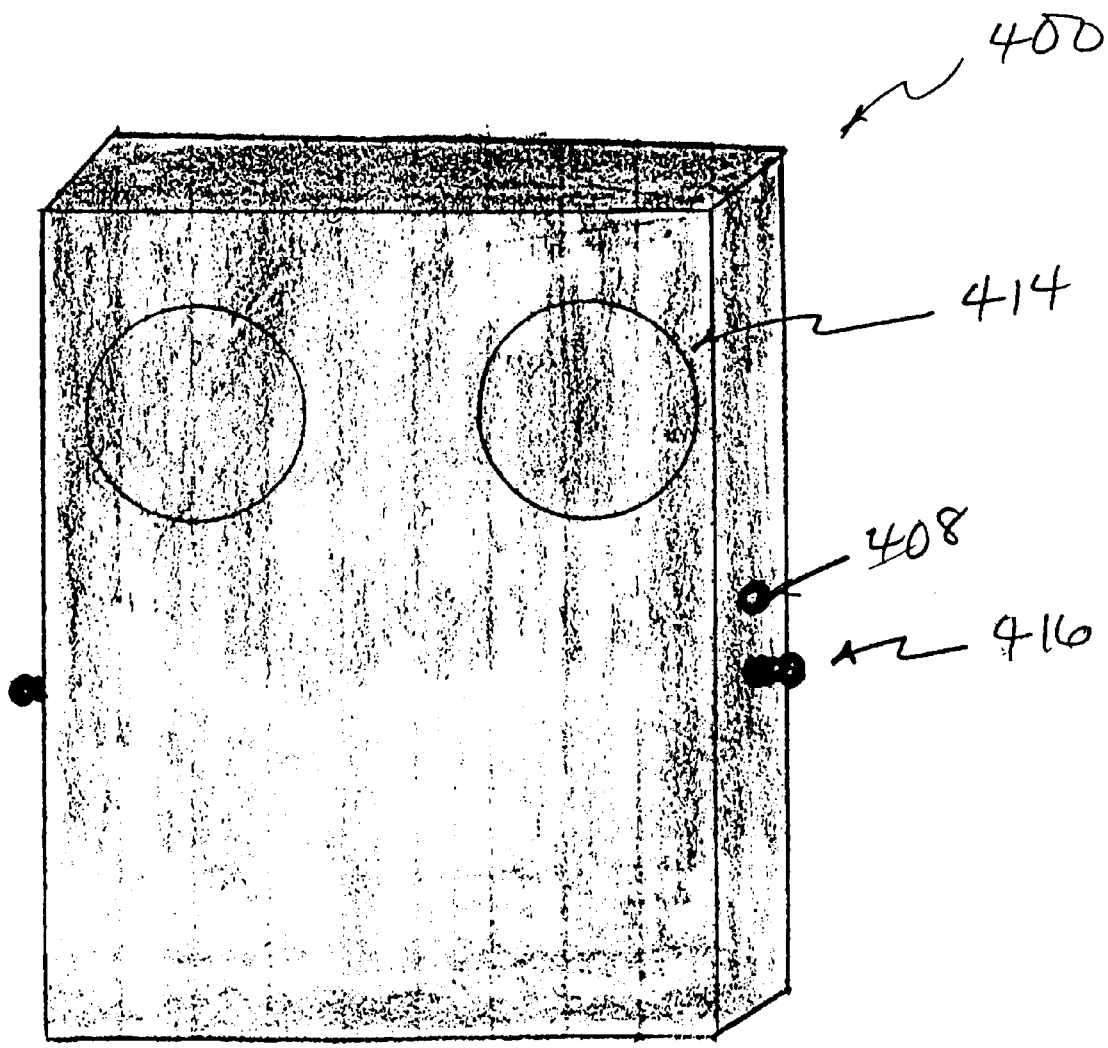
FIG. 8C is an enlarged, perspective view of another alternative embodiment of the signaling device for use with the stand of FIG. 1.

Referring to FIG. 8C, a modified signaling device 400 of that shown in FIG. 8 is shown. The modified signaling device 400 can only be played by the user. The device 400 housing provides female plugs 408, speaker 414, and volume control 416. The device 400 further includes the circuitry of device 300; however, the user cannot record a message. The message is recorded on the EEPROM prior to putting the circuitry in the housing so that the unit is play-only and has no accessible recording by the angler. The message can be a voice, song, phrase, and the like, that notifies the angler of a bite.

Figure 9:
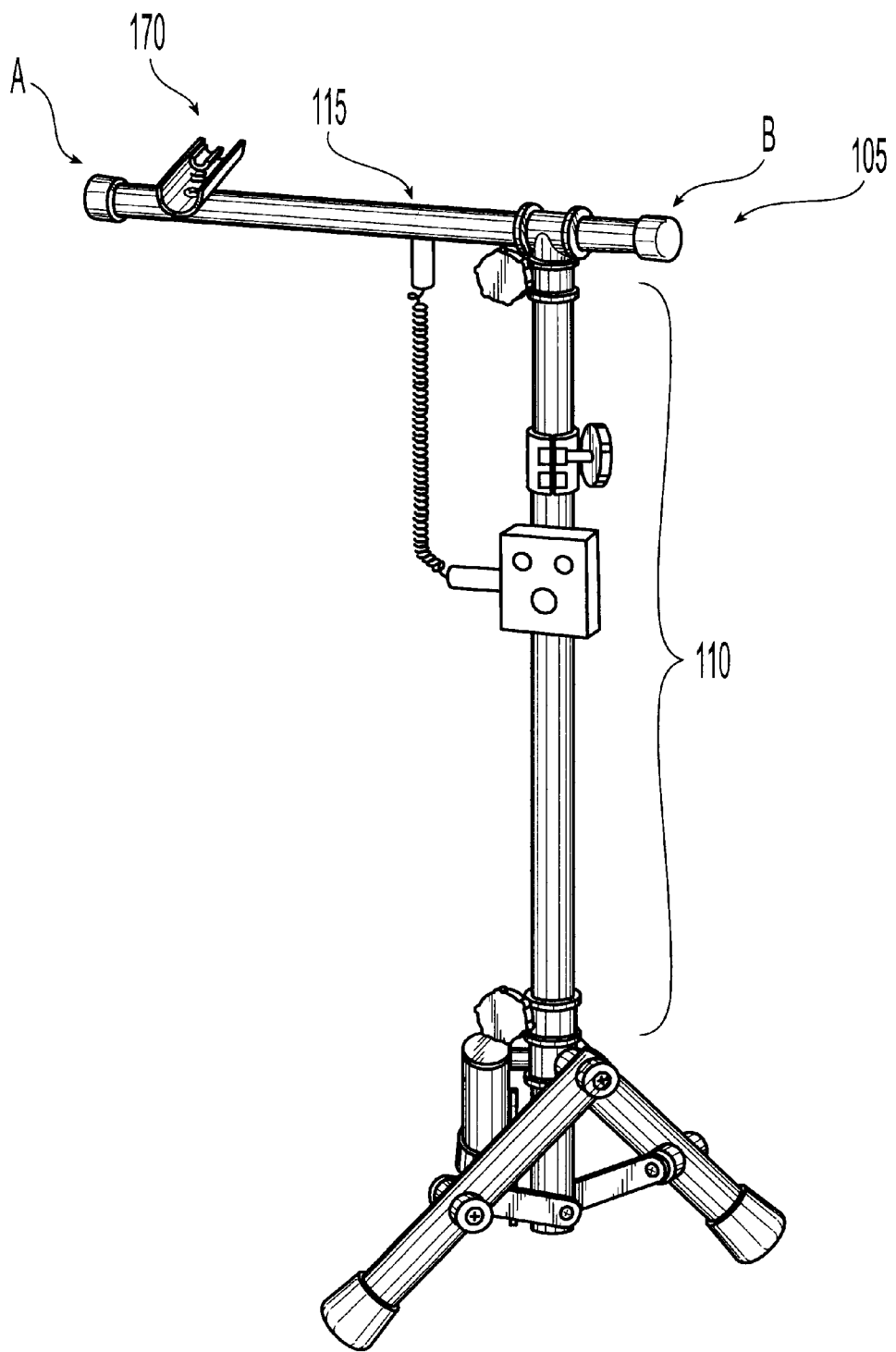
FIG. 9 is a perspective view of an alternative embodiment of the stand for use with one rod.

Referring to FIG. 9, a stand 105 is shown which is modified from the stand 5 (as shown in FIG. 1). The stand 105 has a vertical section 110 like that of stand 5. However, the horizontal tube 115 is shorter than the horizontal tube 15 (as shown in FIG. 1). The horizontal tube has a support member 170 as discussed above near an end A. The support member 170 is configured like those discussed above. The portion of the horizontal tube 105 from the end B toward end A can contain a weight to assure proper balance of the stand 105. The stand 105 works like the stand 5, discussed above. The stand 105 is for use with a single rod.

Figure 10:
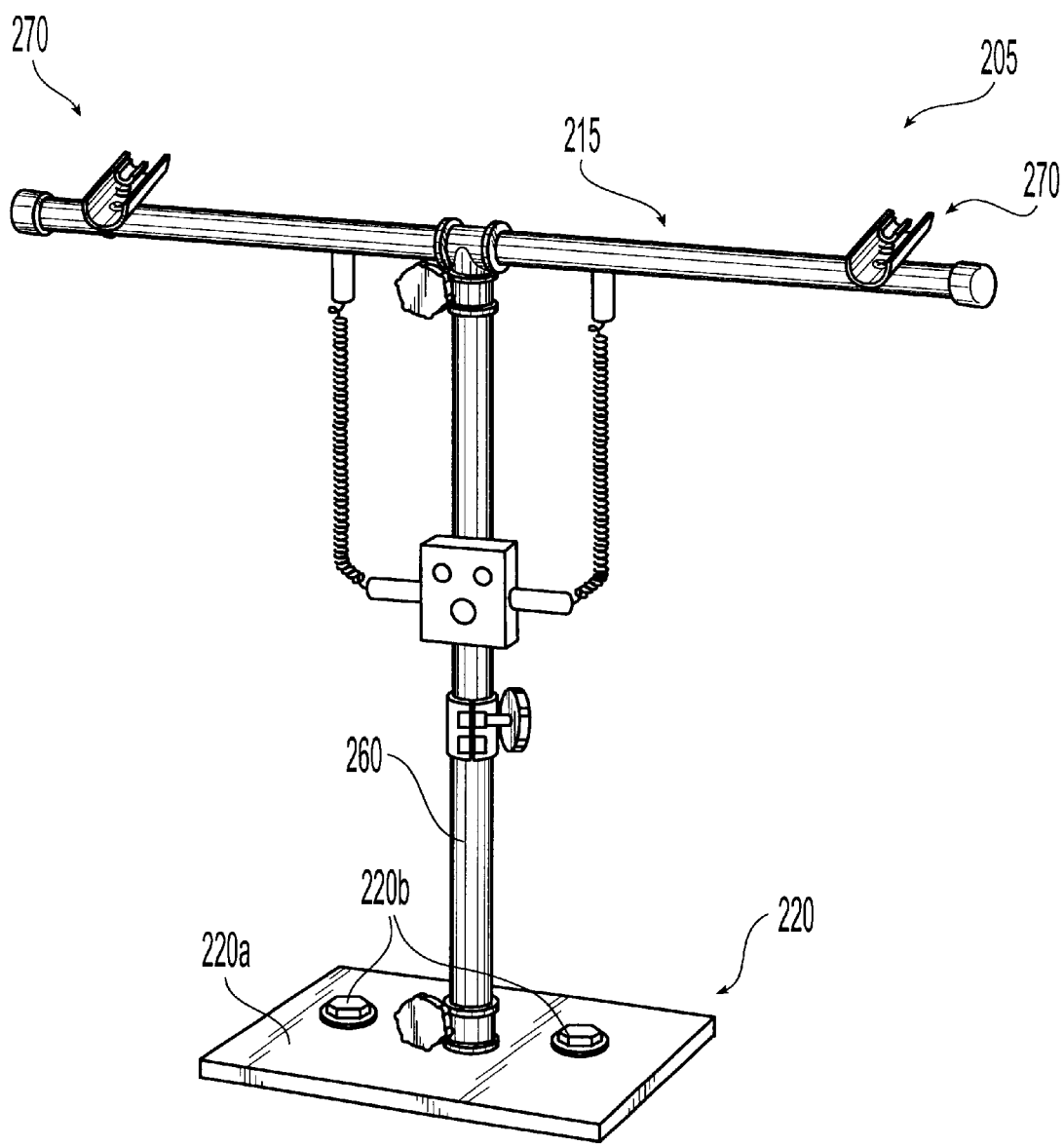
FIG. 10 is a perspective view of an alternative embodiment of the stand for use on, for example a boat.

Referring to FIG. 10, a stand 205 is shown which is modified from the stand 5 (as shown in FIG. 1). The stand 205 has a vertical section 210 similar to that of stand 5, except the base 220 has been modified. The base 220 is formed by a plate 220a fixed to lower tube 260. The plate 220a defines holes therein for receiving screws to fasten the plate to the rail or surface on, for example, a boat. Any number of holes can be defined therein for securing the stand 205 to the surface. The horizontal tube 215 is configured like the tube 15 (as shown in FIG. 1), and has support members 270 thereon is shorter than the horizontal tube 15 (as shown in FIG. 1). The stand 205 works like the stand 5, discussed above.

Figure 11:
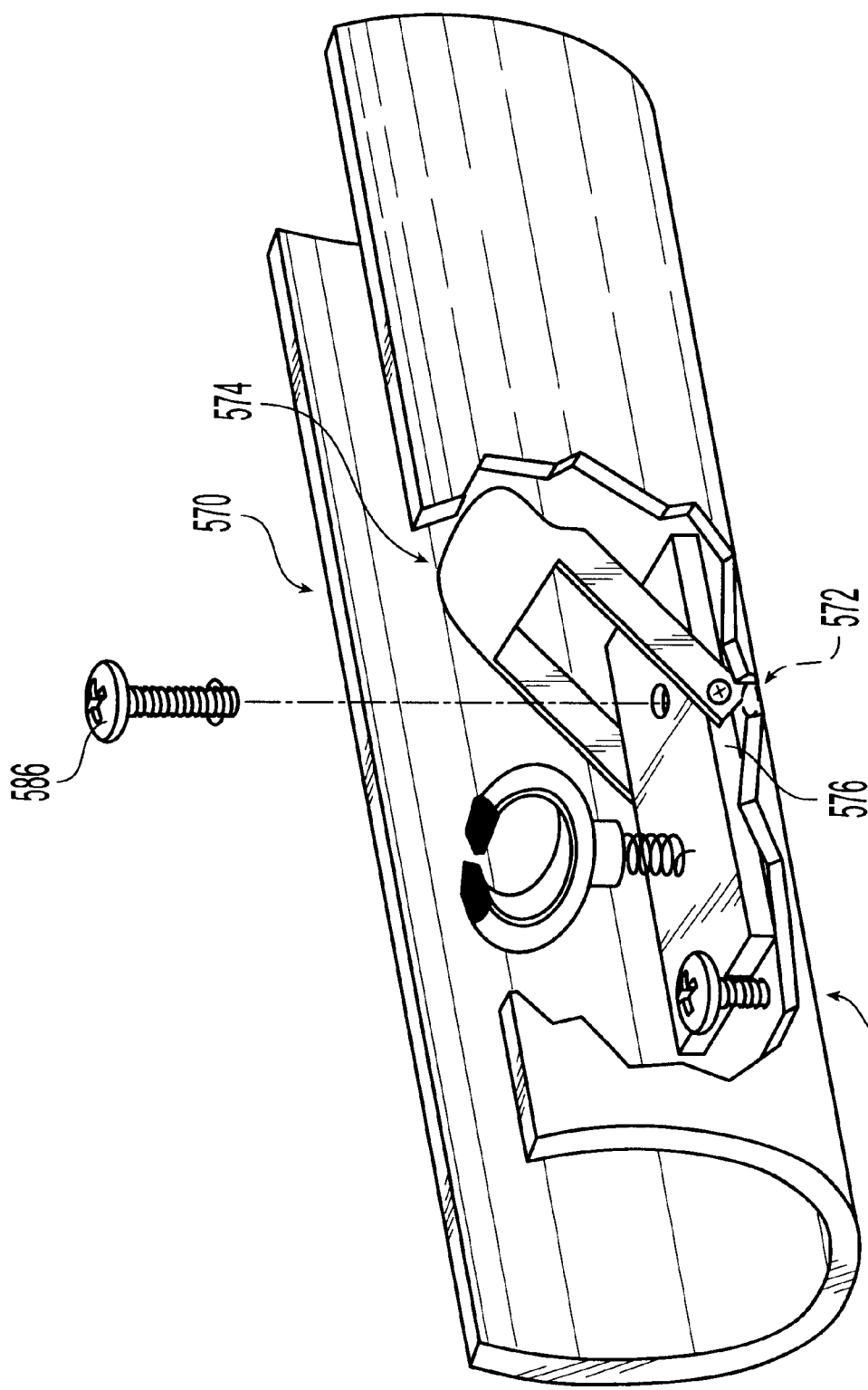
FIG. 11 is an enlarged, perspective view of a rod supporting member having an alternative embodiment of an actuator and spring for use with the stand of FIG. 1, wherein a portion of the supporting member is broken away for clarity.
Figure 11A:
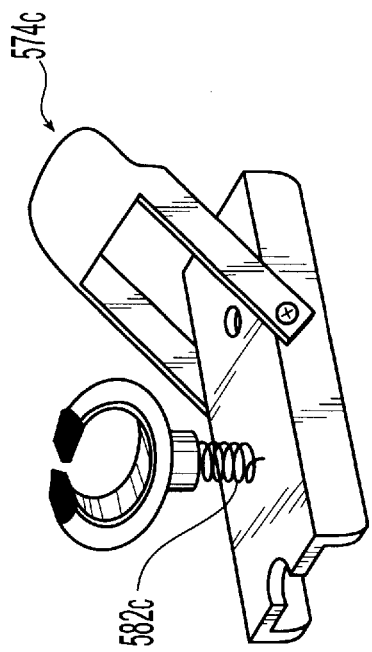
FIGS. 11A–D are enlarged, perspective views of alternative embodiments of actuators and spring mounts for use with the support member of FIG. 11.

Referring to FIGS. 11 and 11A, a modified embodiment of the supporting member 570 is shown. The supporting member 570 includes a rivet 571 connected to the lower wall of the supporting member and defines a hole 572 spaced therefrom. The supporting member 570 is for use with an actuator assembly 574. The assembly 574 includes an actuator with a lower member 576 that defines an alignment notch 578 and a hole 579 therein. The actuator assembly 574 further includes a spring mount 580 with a spring 582 and a cradle 584. The spring 582A has a spring constant for use with fish that apply 5–8 ozs of force. In use, the user disposes the rivet 571 within notch 578. The assembly 574 is secured to support member 570 by fastener 586 that is disposed through hole 579 and hole 572. This releasably secures the assembly 574 to the mount 570.

Figure 11C:
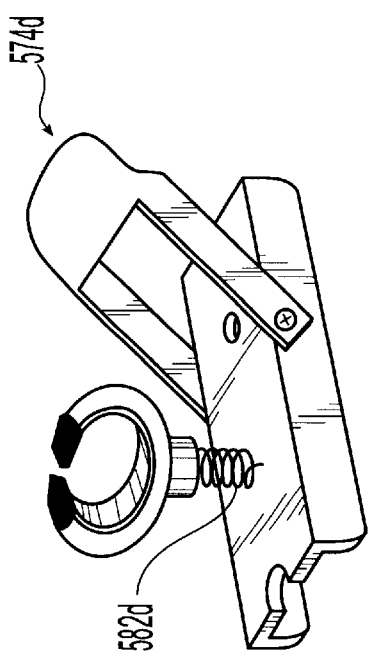
Figure 11B:
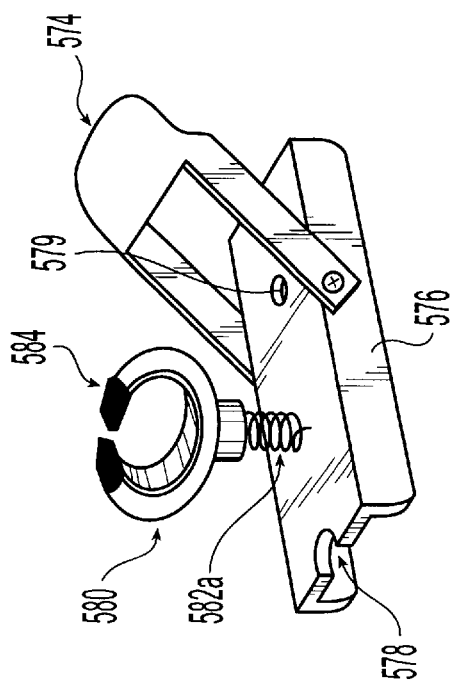
Figure 11D:
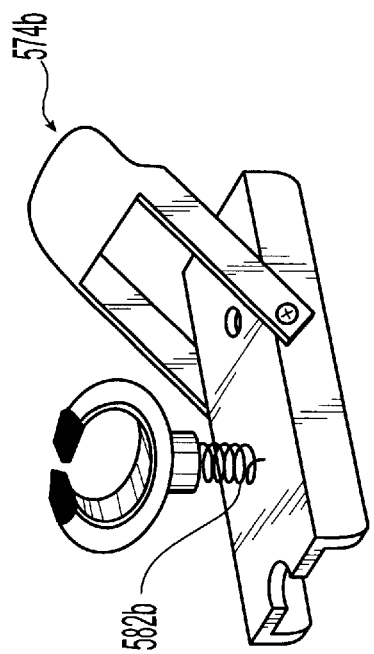

Referring to FIGS. 11B–11C, a set of other actuator assemblies 574B, 574C and 574D are shown that have springs 582B, 582C and 582D with constants that are for use with fish that apply about 8–11 ozs, about 11–14 ozs., and about 14–18 ozs or force, respectively. The actuators 574, 574B–D are preferably provided as a set so that the stand can be used with various type of fish so that the stand is versatile. The actuator assemblies 574B–D can be releasably secured to support members 570 (as shown in FIG. 11), as discussed above. The springs can be coded for each spring force required by, for example, color or alphanumeric characters. Otherwise, the supporting member 570 works similarly to the supporting member 70 discussed above.

Figure 11E:
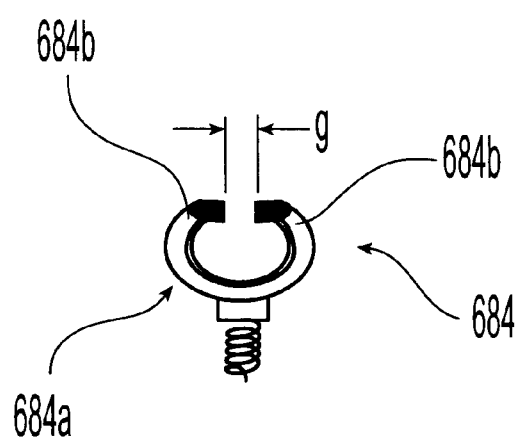
FIG. 11E is a perspective view of an alternative embodiment of a clamp and spring.

Referring to FIG. 11E, cradle 684 is modified and includes a lower portion 684a formed of copper or another metal and free ends 684b are formed of rubber. The free ends are spaced apart by a gap g that is less than the rod diameter so that the rod is securely retained. The rubber free ends can deform to quickly remove the rod.

Figure 12:
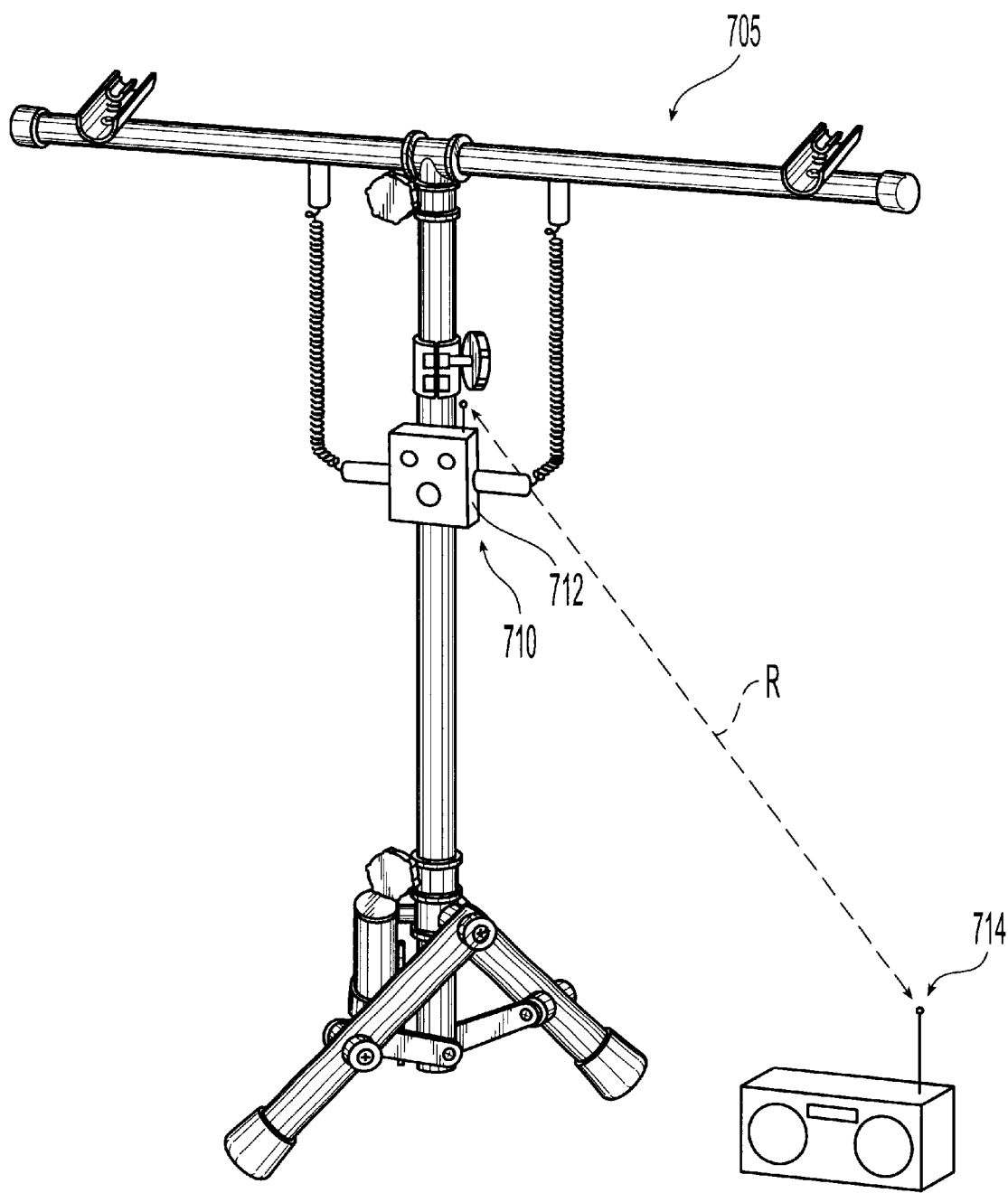
FIG. 12 is a partial, perspective view of an alternative embodiment of the stand including a signaling device with a transmitter, wherein the rods are removed therefrom.

Referring to FIG. 12, a stand 705 is shown with is modified from the stand 5 (as shown in FIG. 1). The stand 705 has a signaling device 710 similar to signaling device 300 (as shown in FIG. 8) except the device 710 includes a transmitter 712 and is for use with a radio 714. The transmitter 712 is preferably a 100–108 MHZ FM transmitter with a range R of about 50–60 yards average.

Figure 13:
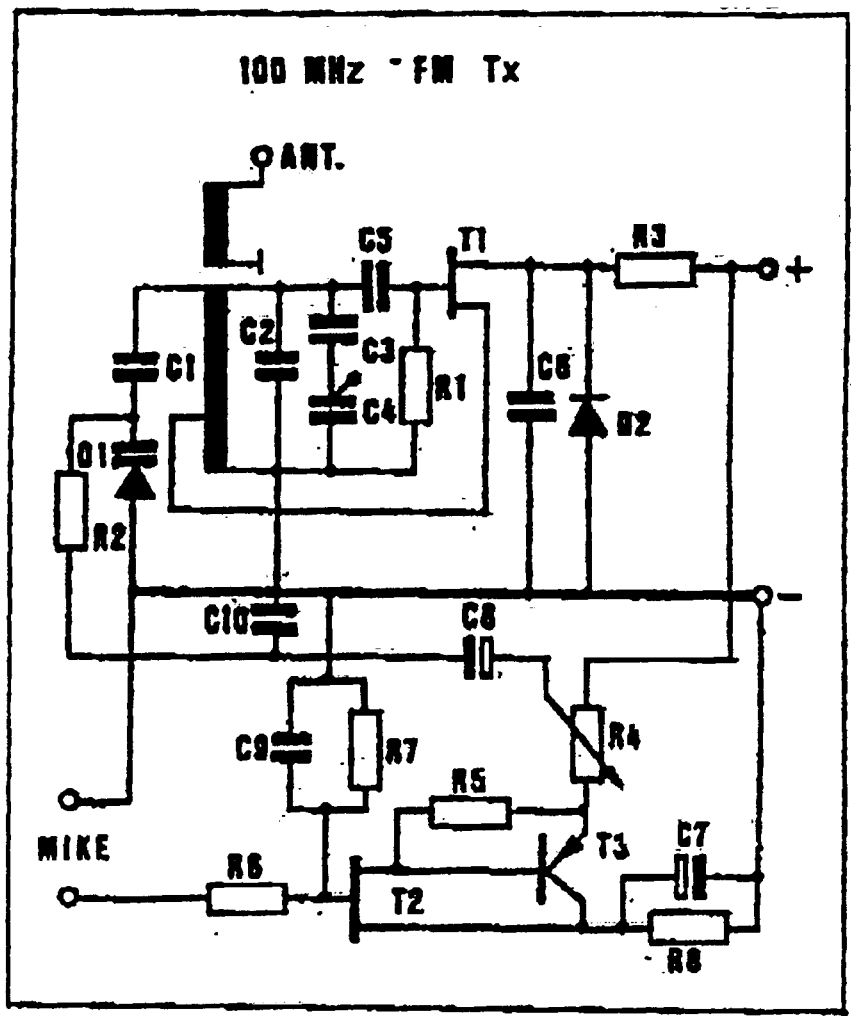
FIG. 13 is a schematic view of the internal circuitry for the transmitter of the signaling device of FIG. 12.

Referring to FIG. 13, the internal circuitry and components of the transmitter 712 are shown. One recommended transmitter 712 is commercially available from Jameco Electronics as Part No. 117604. The device 710 works similarly to the device 300 however when the device 712 signals of a strike the transmitter 712 transmits the signal to FM radio 714 that is spaced from the stand 705 so that the angler can leave the immediate area of the stand and still be alerted of a strike. Although the radio shown is portable, another type of FM radio can be used as the receiver, for example a radio in a vehicle. Other types of transmitters and receivers can also be used such as AM.

Figure 14:
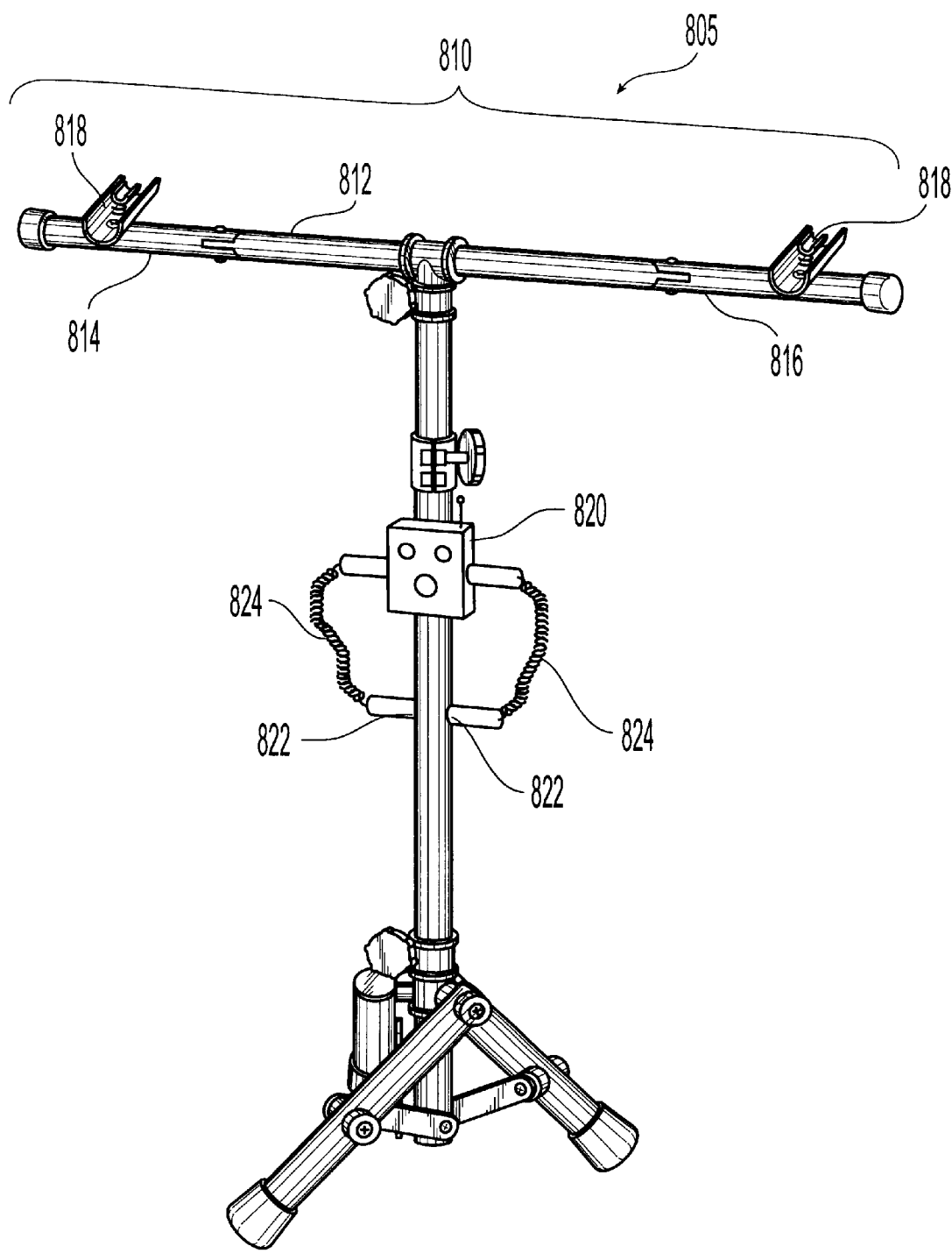
FIG. 14 is a partial, perspective view of another alternative embodiment of a stand of the present invention.

Referring to FIG. 14, a stand 805 is shown with is modified from the stand 5 (as shown in FIG. 1). The stand 805 has a horizontal section 810 formed of a central portion 812 and two end portions 814 and 816. The end portions 814 and 816 are pivotally connected to the central portion 812. This simplifies set-up and breakdown of the stand 805 by pivoting the arms into and out of position. The stand 805 further includes internal wiring from switches (not shown) in support members 818 to signaling device 820. The stand includes female plugs 822 that connect the internal wiring to the signaling device via the cords 824 with male connecters on both free ends of cords 824. Otherwise, the stand 805 is similar to those discussed above.

Figure 15:
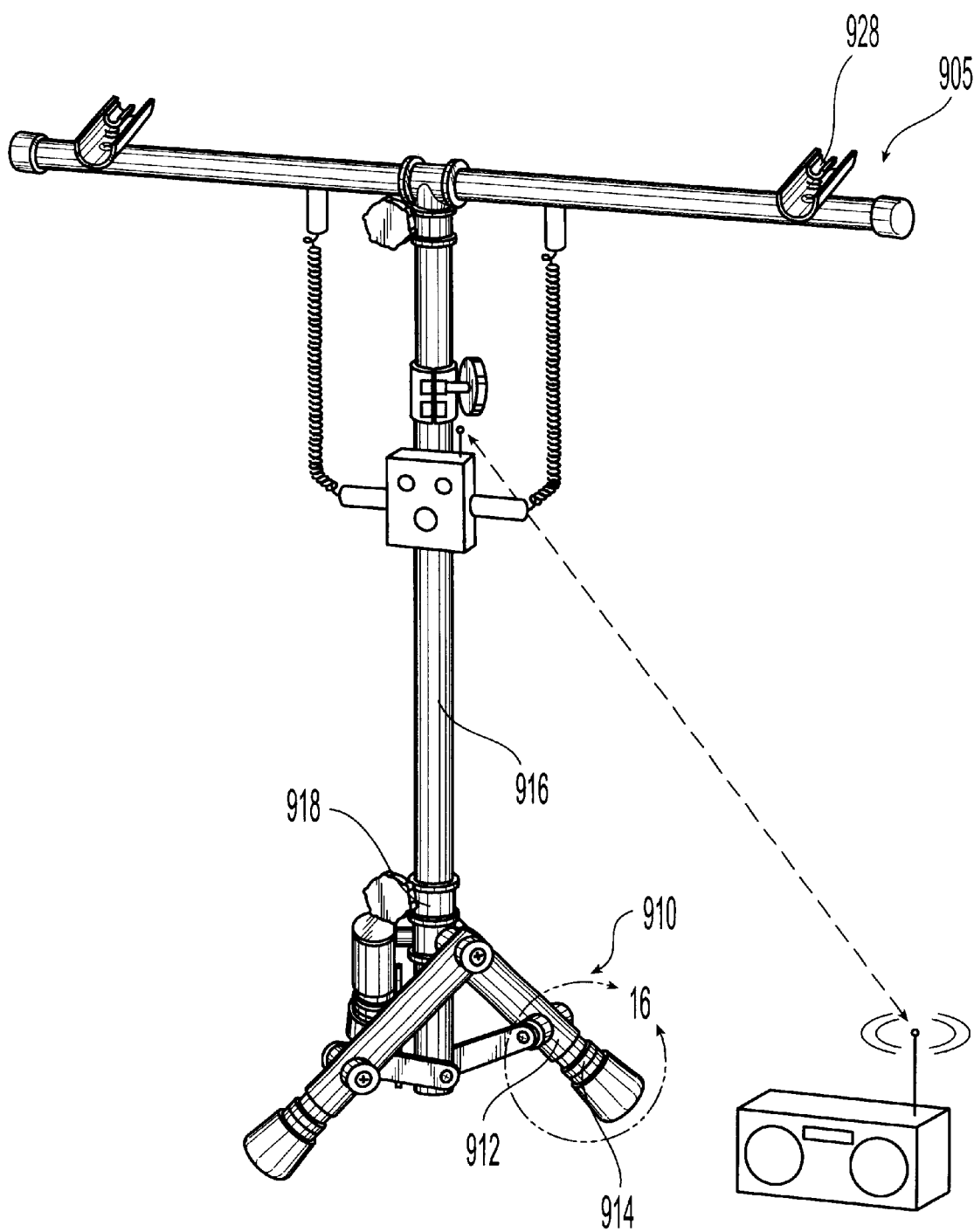
FIG. 15 is a partial, perspective view of yet another embodiment of the present invention.
Figure 16:
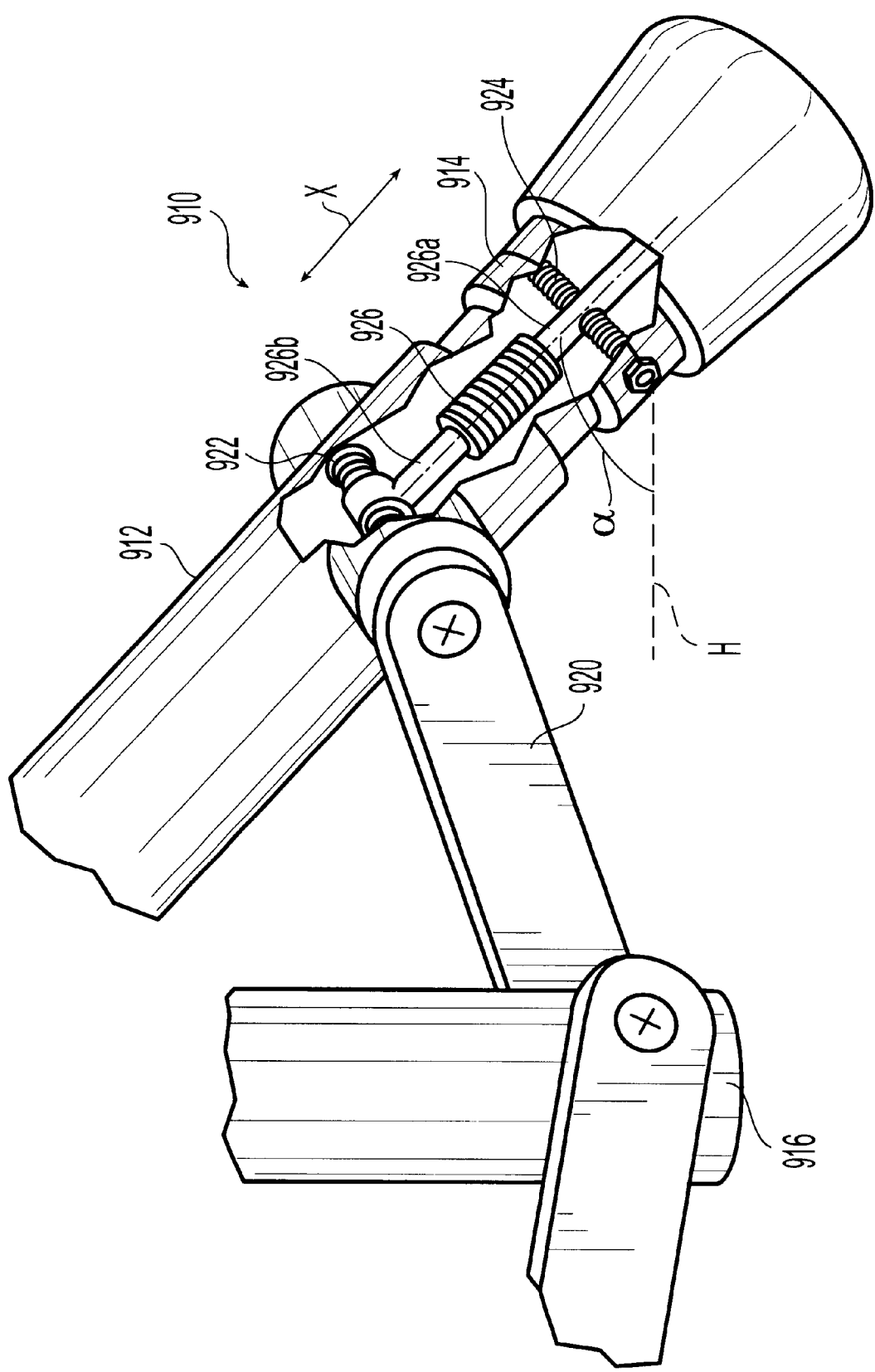
FIG. 16 is a partial, perspective view of a portion of a tripod base within the circle 16—16 of FIG. 15, wherein a portion is broken away for clarity.

Referring to FIGS. 15 and 16, a modified stand 905 is shown. The stand 905 is similar to stand 805 (shown in FIG. 14); however at least one leg 910 and preferably all three legs 910 include an upper leg portion 912 and a lower leg portion 914. The upper leg portion 912 is pivotally connected to the lower tube 916 and collar 918. The lower leg portion 914 is slidable with respect to upper leg portion 912 as indicated by arrow X. The upper leg portion 912 includes a bracket 920 that is secured to portion 912 without fastener 922.

Referring to FIG. 16, the lower leg portion 914 includes a fastener 924 and piston 926 with lower movable arm 926a and upper movable arm 926b. Lower piston arm 926a is connected to fastener 924. Upper piston arm 926b is connected to fastener 922.

The lower portion 914 further includes mercury switch 928 and 6 volt power supply 930 electrically connected to piston 926. The preferred piston is commercially available from Jameco Electronics under the name Electric Pistons™ part No. 141093. The switch 928 is commercially available from Marks Electronics under the Part No. 35-760Bu.

Figure 17:
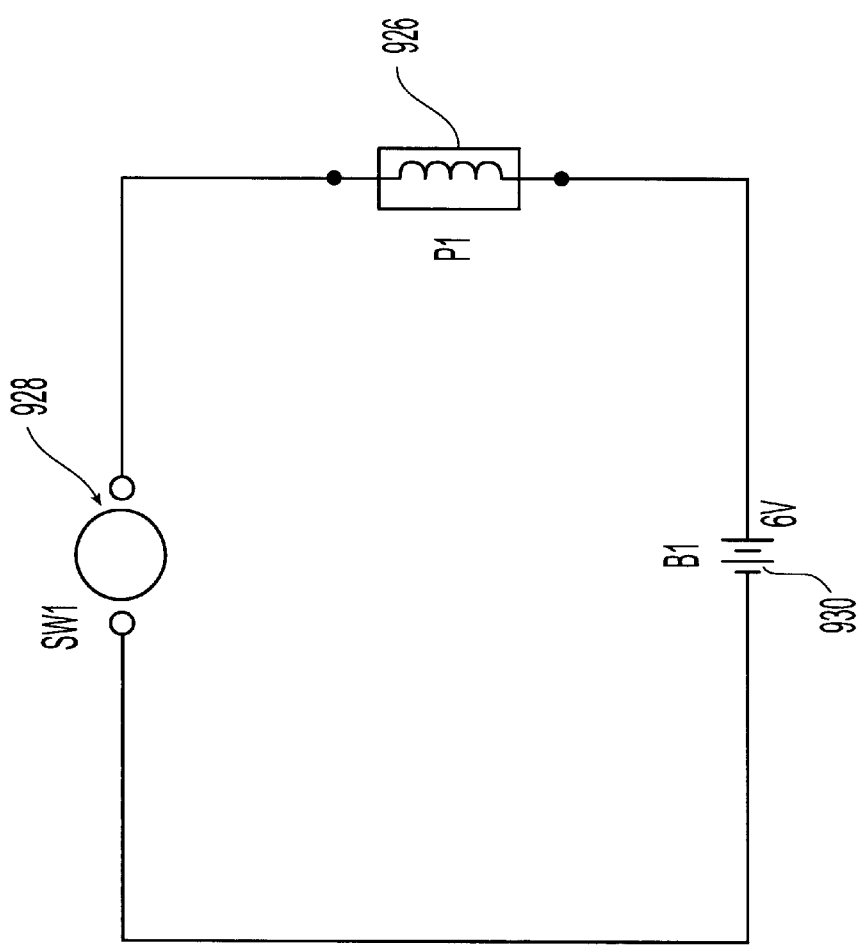
FIG. 17 is a schematic view of the internal circuitry for the components of the base shown in FIG. 16.

Referring to FIGS. 16–17, the switch 928 is positioned within leg portion 914 so that when an angle α between the leg portion 914 and horizontal changes a predetermined amount to mercury switch actuates the piston and causes leg portion 914 to move inward or outward. Upon such movement the angle a returns to its original value. The mercury can move as a result of the stand being, for example, blown or bumped. This self-leveling occurs in each leg 910 independently to keep the stand 905 balanced and upright. The mercury switch can also be positioned and connected to the switch in the support member 928 so that upon a fish strike the leg portions 914 raise the stand and automatically set the hook in the fish. The leveling or hook setting can also be actuated by a remote control held by the angler.

While it is apparent that the invention herein disclosed is well calculated to fulfill the objects above stated, it will be appreciated that modifications and embodiments may be devised by those skilled in the art. One such modification includes disposing a plurality of magnets in the legs and vertical section to assist in opening the stand legs. The embodiments above can also be modified so that some features of one embodiment are used with the features of another embodiment. It is intended that the appended claims cover all such modifications and embodiments as fall within the true spirit and scope of the present invention.

What is claimed is:

1. A stand for holding at least one fishing rod having a handle, a free end spaced therefrom, and a line, the stand comprising:

a frame for supporting the fishing rod between the handle and the free end, the frame comprising at least one rod supporting member having a switch mounted thereto, the switch being disposed beneath the fishing rod, an actuator with a pivotal member mounted thereto such that the pivotal member is above the switch, and a spring mount coupled to the rod supporting member, the spring mount having a cradle disposed above the pivotal member, wherein in an unactuated position the cradle is spaced from the pivotal member and a first force above a predetermined value by the pivotal member exerts a second force on the switch; and a signaling device for providing at least one signal to a user when a fish pulls the line electrically connected to the signaling device;

wherein upon the fish pulling the line, the fishing rod moves downward and depresses the switch causing the signaling device to signal the user.

2. The stand of claim 1, wherein the signal is visual.

3. The stand of claim 1, wherein the signal is audible.

4. The stand of claim 1, wherein there is one visual signal and one audible signal.

5. The stand of claim 4, wherein signaling device further includes at least one light emitting diode and a horn electrically connected to the switch.

6. The stand of claim 3, wherein the signal is a recorded message.

7. The stand of claim 3, wherein the signaling device further includes a transmitter and the transmitter is operatively associated with a radio so the transmitter sends the signal to the radio.

8. The stand of claim 1, wherein the signal device is removably secured to the frame.

9. The stand of claim 1, wherein the frame includes a vertical section including an upper tube and a lower tube slidably coupled thereto.

10. The stand of claim 9, wherein the frame further includes a horizontal tube coupled to the upper tube, the horizontal tube for supporting the switch.

11. The stand of claim 10, wherein the horizontal tube has two end portions pivotally connected to a center portion and the center portion is coupled to the upper tube.

12. The stand of claim 1, wherein the spring mount further includes a spring for supporting the cradle above the pivotal member.

13. The stand of claim 12, wherein the predetermined value is about 11 ozs.

14. The stand of claim 12, wherein a set of springs having different predetermined values are removably connectable to the support member.

15. The stand of claim 1, wherein the fishing rod further includes a length, and the handle being supported on a surface and the frame supports the fishing rod between the free and a point disposed at least half the length of the fishing rod from the handle.

16. The stand of claim 10, wherein the frame includes first and second rod supporting members at either end of the horizontal tube for supporting first and second rods.

17. The stand of claim 16, wherein a first signal indicates a strike on first rod and a second different signal indicates a strike on the second rod.

18. The stand of claim 9, wherein the frame further includes a tripod base including foldable legs pivotally connected to the lower tube.

19. The stand of claim 1, wherein each leg includes an upper leg portion, a lower leg portion coupled by a piston, a switch and battery connected to the piston; wherein upon actuation of the switch, the piston slides the lower leg portion with respect to the upper leg portion.

20. The stand of claim 9, further including a plate connected to the lower tube and fasteners for securing the plate to a surface.

21. The stand of claim 1, wherein the signaling device further includes an EEPROM.

* * * * *

UNITED STATES PATENT AND TRADEMARK OFFICE
CERTIFICATE OF CORRECTION

PATENT NO.   : 6,341,443 B1
DATED        : January 29, 2002
INVENTOR(S)  : Watford et al.

It is certified that error appears in the above-identified patent and that said Letters Patent is hereby corrected as shown below:

<u>Title page,</u>
Item [76], Inventors, delete "12402 Gable La.;" add -- 2614 Keith St.;-- delete "12401 Gable La., both of Ft. Washington, MD (US) 20744" add -- 2614 Keith St., -- both of Temple Hills, MD (US) 20748 --

Signed and Sealed this

Sixteenth Day of April, 2002

Attest:

JAMES E. ROGAN
Attesting Officer     Director of the United States Patent and Trademark Office